United States Patent [19]

Hayes

[11] Patent Number: 4,838,900
[45] Date of Patent: Jun. 13, 1989

[54] POLYIMIDE GAS SEPARATION MEMBRANES

[75] Inventor: Richard A. Hayes, Hockessin, Del.

[73] Assignee: E. I. Du Pont De Nemours and Company, Wilmington, Del.

[21] Appl. No.: 175,503

[22] Filed: Apr. 13, 1988

[51] Int. Cl.$^4$ .......................................... B01D 53/22
[52] U.S. Cl. ........................................ 55/16; 55/158; 210/500.39; 528/128; 528/229
[58] Field of Search ....................... 55/16, 68, 158; 210/500.39; 264/184; 528/128, 229, 342, 348

[56] References Cited

U.S. PATENT DOCUMENTS

| | | | |
|---|---|---|---|
| Re. 30,351 | 7/1980 | Hoehn et al. | 55/16 |
| 3,423,491 | 1/1969 | McLain et al. | 264/49 |
| 3,816,303 | 6/1974 | Wrasidlo | 210/500.39 X |
| 3,822,202 | 7/1974 | Hoehn | 55/16 |
| 3,957,651 | 5/1976 | Kesting | 210/490 |
| 4,113,628 | 9/1978 | Alegranti | 210/500.39 X |
| 4,156,597 | 5/1979 | Browall | 55/16 |
| 4,240,914 | 12/1980 | Iwama et al. | 210/500.39 |
| 4,358,378 | 11/1982 | Iwama et al. | 210/500.39 X |
| 4,370,290 | 1/1983 | Makino et al. | 264/184 |
| 4,378,324 | 3/1983 | Makino et al. | 210/500.39 X |
| 4,378,400 | 3/1983 | Makino et al. | 55/16 X |
| 4,440,643 | 4/1984 | Makino et al. | 210/500.39 X |
| 4,460,526 | 7/1984 | Makino et al. | 264/184 X |
| 4,474,662 | 10/1984 | Makino et al. | 55/158 X |
| 4,474,858 | 10/1984 | Makino et al. | 55/158 X |
| 4,512,893 | 4/1985 | Makino et al. | 55/158 X |
| 4,528,004 | 7/1985 | Makino et al. | 55/16 X |
| 4,532,041 | 7/1985 | Shuey et al. | 210/500.39 |
| 4,629,685 | 12/1986 | Pfeifer | 528/229 X |
| 4,629,777 | 12/1986 | Pfeifer | 528/128 X |
| 4,690,873 | 9/1987 | Makino et al. | 55/158 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,746,474 | 5/1988 | Kohn | 55/16 X |

FOREIGN PATENT DOCUMENTS 2050251 7/1969 France.
2102333 2/1983 United Kingdom.
2104411 3/1983 United Kingdom.

*Primary Examiner*—Robert Spitzer

[57] ABSTRACT

Aromatic polyimide gas separation membranes of the formula:

$$-N\diagup\!\!\!\!\diagdown R \diagup\!\!\!\!\diagdown N-Ar-$$

(with four C=O groups)

where —Ar— is

[structure with Z, $Z_1$, X, $X_3$, $X_1$, $X_2$ substituents on diphenylmethane]

—R— is

[phenylene, naphthylene structures]

[biphenyl with R' linker]

[biphenyl structure]

or mixtures thereof, —R'— is $$-\underset{X_1}{\overset{X}{\underset{|}{C}}}-,\ -O-,\ -S-,\ -\underset{O}{\overset{O}{\underset{\|}{S}}}-,\ -\underset{}{\overset{O}{\underset{\|}{C}}}-,\ -\underset{CF_3}{\overset{CF_3}{\underset{|}{C}}}-$$

[diphenyl ether with (X)$_n$ substituents]

[diaryl ether with R'' linker and (X)$_n$ substituents]

linear alkylene groups of the formula $(CH_2)_{1-3}$ or mixtures thereof, where —R''— is $$-\underset{X_1}{\overset{X}{\underset{|}{C}}}-,\ -O-,\ -S-,\ -\underset{O}{\overset{O}{\underset{\|}{S}}}-,\ -\underset{}{\overset{O}{\underset{\|}{C}}}-,\ -\underset{CF_3}{\overset{CF_3}{\underset{|}{C}}}-$$

—X, —$X_1$, —$X_2$, and —$X_3$ are independently primary or secondary alkyl groups having 1 to 6 carbon atoms preferably methyl, ethyl, or isopropyl —Z and —$Z_1$ are independently hydrogen or halogens such as iodine, bromine or chlorine preferably chlorine, and where n=0–4.

14 Claims, No Drawings

POLYIMIDE GAS SEPARATION MEMBRANES

FIELD OF THE INVENTION

The present invention relates to aromatic polyimide gas separation membranes prepared from alkyl-substituted methylene dianilines and various aromatic dianhydrides.

BACKGROUND OF THE INVENTION

Applicant's earlier application, Ser. No. 853,341, filed Apr. 17, 1986, now U.S. Pat. No. 4,705,540, describes polyimide membrane materials with exceptional gas permeation properties. The polyimide materials disclosed therein were compositionally prepared essentially from ortho-alkyl-substituted aromatic phenylenediamines with structurally rigid aromatic dianhydrides. Membranes from these materials offered moderate selectivities between gases. This level of selectivity has been improved in the present invention. The polyimide membrane materials described in the present application, therefore, find utility in a greater range of industrial gas separations.

Another of applicant's earlier application, Ser. No. 923,486 filed Oct. 27, 1986, now U.S. Pat. No. 4,717,394 demonstrated that a greater range of gas productivities could be achieved through the controlled addition of less chain rigidity than that found for the above application. This was accomplished, in part, through the use of mixtures of diamines which are rigid and substituted on essentially all of the positions ortho to the amine substituents and diamines which are essentially unsubstituted. The polyimide membrane materials described in the present invention can be prepared more efficiently by the use of methylene dianilines which incorporate both structural considerations described above.

U.S. Pat. Nos. 4,629,685 and 4,629,777 broadly disclose and claim similar compositions of matter as described herein for use in the electronics industry. They do not disclose any utility for gas separations.

U.S. Pat. No. Re. 30,351 and U.S. Pat. No. 3,822,202 (Du Pont) disclose aromatic polyimide gas separation membranes in which the molecular structure is such that the molecules in the polymer are unable to pack densely and, therefore, have high gas permeation rates. The membrane materials described in the present invention offer greater gas productivities.

U.S. Pat. No. 4,113,628 discloses aromatic polyimide gas separation membranes prepared from polyimide acid membranes.

U.S. Pat. Nos. 4,370,290, 4,460,526, 4,474,662, 4,512,893, and U.K. No. 2,102,333 disclose microporous aromatic polyimide membranes and the process from which they are prepared.

U.S. Pat. No. 4,486,376 discloses gas separation membranes made from microporous aromatic polyamide support treated with modifying agents.

U.S. Pat. Nos. 4,378,324, 4,440,643, 4,474,858, 4,485,056, 4,528,004, and U.K. No. 2,104,411 disclose gas separation membranes made from a microporous aromatic polyimide support coated with an aromatic polyamide acid or aromatic polyimide.

U.S. Pat. No. 4,378,400 discloses aomatic polyimide gas separation membranes in which the molecular structure is such that the molecules in the polymer can pack densely.

DETAILED DESCRIPTION

The present invention relates to the discovery that aromatic polyimides prepared by polycondensation of dianhydrides with methylene dianilines having substituents on all positions ortho to the amine functions to form membranes with exceptional gas permeability. The gas permeability increases substantially if structurally-rigid dianhydrides are used in combination with the substituted diamines. This increase in productivity of these membranes is believed to be due to the high molecular free volume in the polymer structure resulting from the rigid nature of the rotationally hindered polymer chains.

Generally, extremely high gas permeation rates through dense polymeric membranes are found only above their glass transition temperatures (Tg). Silicone rubbers and many olefin polymers are typical examples of such materials. The low Tg materials are generally only useful as the separating layer in composite membranes, where a supporting porous membrane substructure provides structural integrity. Membranes prepared from such materials tend to have low selectivities between permeating gases.

High Tg polymeric materials usually have greater selectivity between gases than the low Tg polymeric materials described above. This provides for a more efficient separation of one gas from a mixture of two or more gases. However, the majority of such high Tg polymeric materials found in the prior art do not possess extremely high gas permeabilities. Examples reported involve mostly unsubstituted, or partially substituted, polymers subject to forming close chain packing during fabrication and/or subsequent operation.

The present invention circumvents the above shortcomings and provides exceptionally high permeability dense membranes with good selectivities between gases using high Tg aromatic polyimides containing the repeating unit:

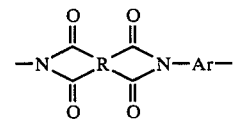

where —Ar— is

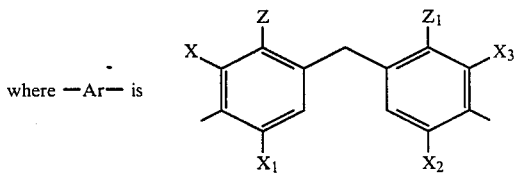

R is

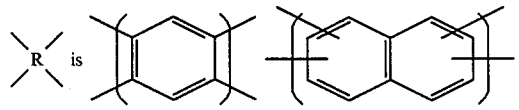

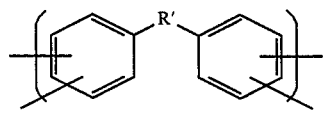

-continued

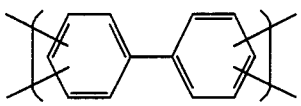

or mixtures thereof, —R'— is

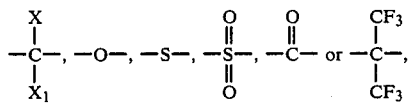

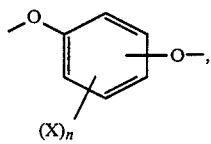

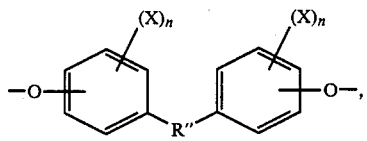

linear alkylene groups of the formula $(CH_2)_{1-3}$, or mixtures thereof, where —R'' is

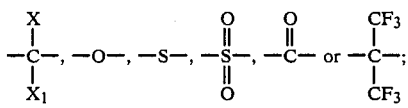

—X, —$X_1$, —$X_2$, and —$X_3$

—X, —$X_1$, —$X_2$, and —$X_3$ are independently primary or secondary alkyl groups having 1 to 6 carbon atoms preferably methyl, ethyl, or isopropyl: —Z and —$Z_1$ are independently hydrogen or halogens such as iodine, bromine or chlorine preferably chlorine, and where n=0-4.

The multiple substitutions ortho to the amine functions in the above illustrated structures sterically restricts free rotation around the imide linkage. This causes the aromatic residue of the diamine function to be held out of the plane of the imide function and the aromatic residue of the dianhydride function. Electronic ring conjugation within the aromatic polyimide chain is, therefore, greatly reduced. Further, the beforementioned alkyl substituents and the optional halide substituents sterically block strong electronic interactions between different polyimide chains within the membrane. It is believed that these structural considerations allow for a greater molecular free volume within the membranes of this invention which leads to the exceptionally high gas permeabilities found.

The incorporation of the methylene bridge in the amine function serves as a flexible unit and allows for the partial relaxation of this rigidity in the polyimide chain. The partial relaxation is believed to lead to lowered molecular free volume within the membrane and promote greater selectivity for the permeation of certain gases from multicomponent gas mixtures through the membrane. Further relaxation may be accomplished through the use of the less rigid dianhydride components disclosed above.

By varying the amount of relaxation in the polymers of this invention, membranes can be tailored for a wide range of gas separations with exceptional gas productivities. It is these unique structural considerations incorporated within the diamine residue which gives rise to the exceptional gas productivities found.

The before-mentioned unique structural considerations incorporated within the diamine residue give rise to greater gas permeation rates than are found in the prior art. For example, one of the best materials exemplified in U.S. Pat. No. Re. 30,351 is described in the herein contained Comparative Example. This Comparative Example can be directly compared with material described herein prepared with the same diahydride component, 4,4'-[2,2,2-trifluoro-1-(trifluoromethyl)ethylidene]bis(1,2-benzenedicarboxylic acid anhydride) (6FDA), (e.g., Examples 1 and 2). It is important to compare only those materials prepared from the same dianhydride component since this component also contributes unique structural considerations. With this in mind, the materials of this invention as described in Examples 1 and 2 have three to four times the oxygen permeation rate of the Comparative Example which exemplifies U.S. Pat. No. Re. 30,351.

With the above considerations in mind, Examples 4-6, which incorporate 3,3',4,4'-biphenyltetracarboxylic acid anhydride, can be directly compared with materials exemplified in U.S. Pat. No. 4,378,400. The materials disclosed in the herein-disclosed invention have oxygen permeation rates 19 to 93 times the oxygen permeation rates disclosed for the materials exemplified in U.S. Pat. No. 4,378,400.

The polyimides described in this invention have excellent thermal stabilities. They are generally stable up to 400° C. in air or inert atmospheres. The glass transition temperatures of these polyimides are generally above 300° C. The high temperature characteristics of these polyimides can help to prevent the membrane compaction problems often observed in other polymers at even moderate temperatures.

EXAMPLE 1

To a stirred solution of 4,4'-methylene-bis(2-ethyl-6-methyl)aniline (28.2 g, 0.10 mol) in N-methylpyrrolidone (250 ml) was added 4,4'-[2,2,2-trifluoro-1-(trifluoromethyl) ethylidene]bis(1,2-benzenedicarboxylic acid anhydride) (6FDA. 44.8 g, 0.101 mol, last portion washed in with an additional 50 ml N-methylpyrrolidone) under an inert atmosphere at room temperature. The slightly yellow solution was allowed to stir overnight at room temperature. A solution of acetic anhydride (37.7 ml, 0.4 mol), triethylamine (55.6 ml, 0.4 mol) and N-methylpyrrolidone (300 ml) was added with rapid stirring at room temperature. After stirring for 4 hours at room temperature, the reaction solution was precipitated in water. The resulting slightly yellow product was washed with water and methanol. The polymer was air-dried overnight and then dried in a vacuum oven (20 inches mercury) at 120° C. for 3 hours and at 250° C. for 5 hours to yield 61.6 g product.

The resulting polyimide was soluble in N-methylpyrrolidone, dimethylacetamide, dichloromethane, and meta-cresol but insoluble in acetone and toluene.

Films were cast from a 15% solution of the above polymer (based on weight) in N-methylpyrrolidone onto a glass plate treated with Du Pont TEFLON® dry lubricant at 102° C. with 15-mil ($38 \times 10^{-5}$ m) knife gap. (TEFLON® dry lubricant contains a fluorocarbon telomer which reduces the adhesion of the membrane to the glass plate.) The films were dried on the plate at 102° C. for 30 minutes, cooled to room temperature and dried in vacuo (20 inches mercury) at room temperature overnight. The films were stripped off the plate and further dried in a vacuum oven (20 inches mercury) at 120° C. for 4 hours.

The above films (film thickness=1.6 mils, $4.1 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 1700 centiBarrer
$O_2/N_2$ Selectivity: 4.5

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in cmHg, i.e., $$\text{CentiBarrer} = 10^{-12} \frac{cm^3 \text{ (STP)} \cdot cm}{cm^2 \cdot sec \cdot cm\ Hg}$$

COMPARATIVE EXAMPLE

To a stirred solution of 1,5-napthalene diamine (31.6 g) in N,N'-dimethylacetamide under a nitrogen atmosphere was portionwise added 4,4'[2,2,2-trifluoro-1-(trifluoromethyl)ethylidene]-bis-1,2-benzenedicarboxylic acid anhydride) (88.9 g). The reaction solution was heated to 67° C. and stirred for 1 hour. Then a mixture of acetic anhydride (82 g) and triethylamine (82 g) was added as quickly as possible to the stirring reaction solution. After stirring an additional 2 hours at room temperature, the viscous reaction solution was precipitated in methanol. The resulting off-white solid was filtered and dried in a vacuum oven (20 inches mercury) for 1 hour at 150° C. and for 4 hours at 220° C.

Films of the above polyimide were cast from at 15% polymer solution based on weight in N-methylpyrrolidone onto the glass plate treated with TEFLON ® dry lubricant at 60° C. with a 15 mil ($38 \times 10^{-5}$ m) knife gap. The films were dried on the plate, cooled to room temperature, stripped off the plate and dried at room temperature overnight in a vacuum oven (20 inches mercury), and then at 110° C. for 3 hours followed by 220° C. for 4 hours in a vacuum oven (20 inches mercury).

The above films (film thickness=0.5 mils, $1.3 \times 10^{-5}$ m) were tested for mixed gas $O_2/N_2$ (21/79 mole (21/79 mole ratio) permeabilities at 300 psig ($20.7 \times 10^5$ Pa), 25° C. The results are reported below:
$O_2$ Productivity: 560 centiBarrer
$O_2/N_2$ Selectivity: 4.8

EXAMPLE 2

To a stirred solution of 4,4'-methylene-bis(3-chloro-2,6-diethylaniline) (189.7 g, 0.501 mol) in N-methylpyrrolidone (1,000 ml) was added 4,4'-[2,2,2-trifluoro-1-(trifluoromethyl) ethylidene]-bis(1,2-benzenedicarboxylic acid anhydride) (6FDA, 224.5 g, 0.505 mol, last portion washed in with an additional 250 ml N-methylpyrrolidone) at room temperature with a slight nitrogen purge. The reaction solution was slowly heated to boiling while allowing the distillates to collect. After 325 ml of distillates had been collected, the remaining distillates were allowed to flow back into the reaction solution. After boiling at 203° C. for 8 hours, the reaction solution was allowed to cool to room temperature. The solution was diluted with additional N-methylpyrrolidone and precipitated in water. The resulting polymer was washed with water and methanol. The off-white solid was air-dried overnight and dried in a vacuum oven (20 inches mercury) at 120° C. for 3 hours and at 250° C. for 5 hours to yield 378.1 g product.

This polyimide was soluble at greater than 20% solids (based on polymer weight) in toluene, acetone, dichloromethane, N-methylpyrrolidone, dimethylacetamide and meta-cresol.

Differential Scanning Calorimetry (DSC) was performed on the above polymer using a Du Pont thermal Analyzer Model 990-3 with cell model HC81-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 400° C. and a 40% weight loss was observed at 490° C.

A film of the above polyimide was prepared by pouring a 3% polymer solution in dichloromethane (based on weight) into a ring form 9.0 cm in diameter resting on a glass plate to a solution height of 0.16 cm at room temperature. The film was allowed to dry on the glass plate at room temperature and then removed from the plate by soaking in water. The film was further dried in a vacuum oven (20 inches mercury) at 70° C. for more than 6 hours.

The above films (film thickness=2.6 mils, $6.6 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 2200 centiBarrer
$O_2/N_2$ Selectivity: 4.1

EXAMPLE 3

A stirred solution of 4,4'-methylene-bis(3-chloro-2,6-diethylaniline) (113.81 g, 0.30 mol) and 1,2,4,5-benzenetetracarboxylic acid anhydride (66.10 g, 0.303 mol) in N-methylpyrrolidone (650 ml) was slowly heated to boiling with a slight nitrogen purge while allowing the distillates to collect. After 110 ml of distillates had been collected, the remaining distillates were allowed to flowback into the reaction solution. After heating at 201° C. for 8 hours, the viscous reaction solution was allowed to cool to room temperature. The solution was diluted with additional N-methylpyrrolidone and precipitated in water. The resulting solid was washed twice with water and twice with methanol. The solid was air-dried overnight and dried in a vacuum oven (20 inches mercury) at 120° C. for 3 hours and at 250° C. for 5 hours to yield 157.5 g product.

This polyimide was soluble in toluene, dichloromethane, meta-cresol, dimethylacetamide and N-methylpyrrolidone.

Differential Scanning Calorimetry (DSC) was performed on the above polymer using a Du Pont Thermal Analyzer Model 990-3 with cell model HC81-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 420° C. and a 40% weight loss was observed at 455° C.

A film of the above polyimide was prepared by pouring a 2% polymer solution in dichloromethane (based on weight) into a ring form 9.0 cm in diameter resting on a glass plate to a solution height of 0.11 cm at room temperature. The film was allowed to dry on the glass plate at room temperature and then removed from the plate by soaking in water. The film was further dried in a vacuum oven (20 inches mercury) at 70° C. for more than 6 hours.

The above films (film thickness=1.2 mils, $3 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 1700 centiBarrer
$O_2/N_2$ Selectivity: 3.9

EXAMPLE 4

To a stirred solution of 4,4'-methylene-bis(2-ethyl-6-methylaniline) (28.2 g, 0.10 mol) in N-methylpyrrolidone (250 ml) was added 3,3',4,4'-biphenyltetracarboxylic dianhydride (BPDA, 29.7 g, 0.101 mol, last portion washed in with an additional 50 ml N-methylpyrrolidone) under an inert atmosphere at room temperature. After the yellow-orange solution had stirred overnight at room temperature, a solution of acetic anhydride (37.7 ml, 0.4), triethylamine (55.8 ml, 0.4 mol), and N-methylpyrrolidone 150 ml was added with rapid stirring. The resulting yellow solution was stirred at room temperature for 4 hours and then precipitated in water. The polymer was washed twice with water and twice with methanol. After air drying overnight, the solid was dried in a vacuum oven (20 inches mercury) at 120° C. for 3 hours and at 250° C. for 5 hours to give 55 g product.

This polyimide was soluble at greater than 20% solids (based on polymer weight) in N-methylpyrrolidone as well as in dichloromethane and meta-cresol.

Differential Scanning Calorimetry (DSC) was performed on the above polymer using a Du Pont Thermal Analyzer Model 990-3 with cell model HC81-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 410° C. and a 40% weight loss was observed at 510° C.

A film of the above polyimide was prepared by pouring a 3% polymer solution in dichloromethane (based on weight) into a ring form 9.0 cm in diameter resting on a glass plate to a solution height of 0.16 cm at room temperature. The film was allowed to dry on the glass plate at room temperature and then removed from the plate by soaking in water. The film was further dried in a vacuum oven (20 inches mercury) at 70° C. for more than 6 hours.

The above films (film thickness=2.2 mils, $5.6 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 900 centiBarrer
$O_2/N_2$ Selectivity: 4.5

EXAMPLE 5

To a stirred solution of 4,4'-methylene-bis(2-methyl-6-isopropylaniline) (31.0 g, 0.10 mol) in N-methylpyrrolidone (250 ml) was added 3,3',4,4'-biphenyltetracarboxylic dianhydride (BPDA, 29.7 g, 0.101 mol, last portion washed in with an additional 50 ml N-methylpyrrolidone) under an inert atmosphere at room temperature. After the dark orange solution had stirred overnight at room temperature, a solution of acetic anhydride (37.7 ml, 0.4 mol) and triethylamine (55.8 ml, 0.4 mol) was added with rapid stirring. The resultant light orange solution was stirred at room temperature for 4 hours and then precipitated in water. The off-white solid was collected by filtration, washed twice with water and washed twice with methanol. The polymer was air dried overnight, and then dried in a vacuum oven (20 inches mercury) at room temperature overnight, at 120° C. for 3 hours and at 250° C. for 5 hours to yield 53.2 g product.

This polyimide was soluble at greater than 20% solids (based on polymer weight) in N-methylpyrrolidone, dimethylsulfoxide and dimethylacetamide as well as in dichloromethane and meta-cresol.

Differential Scanning Calorimetry (DSC) was performed on the above polymer using a Du Pont Thermal Analyzer Model 990-3 with cell model HC81-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 400° C. and a 40% weight loss Was observed at 515° C.

Films of the polyimide prepared above were cast from a 15% polymer solution (based on weight) in N-methylpyrrolidone onto a glass plate treated with TEFLON® dry lubricant at 100° C. with a 15-mil ($38.4 \times 10^{-5}$ m) knife gap. The films were dried on the plate at 100° C. for 25 minutes, cooled to room temperature and further dried in a vacuum oven (20 inches mercury) at room temperature overnight. The films were stripped off the plate and dried in a vacuum oven (20 inches mercury) at 120° C. for 4 hours.

The above films (film thickness=1.7 mils, $4.3 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 900 centiBarrer
$O_2/N_2$ Selectivity: 4.7

EXAMPLE 6

To a stirred solution of 4,4'-methylene-bis(3-chloro-2,6-diethylaniline) (189.5 g, 0.5 mol) in N-methylpyrrolidone (1,000 ml) was added 3,3',4,4'-biphenyltetracarboxylic dianhydride (BPDA, 148.6 g, 0.505 mol, last portion washed in with an additional 100 ml N-methylpyrrolidone) at room temperature with a slight nitrogen purge. The reaction solution was slowly heated to the boiling point of N-methylpyrrolidone (204° C.) while allowing volatiles to distill out. After 300 ml of a water/N-methylpyrrolidone solution had distilled out over 3.5 hours, the distillates were allowed to flow back into the reaction solution. After the very viscous reaction solution had stirred for a total of 6.7 hours at ~204° C., the reaction was allowed to slowly cool to room temperature. The solution was diluted with N-methylpyrrolidone and precipitated in water. The resulting solid was successively washed with water and methanol. The off-white polymer was air-dried overnight and then dried in a vacuum oven (20 inches mercury) at 120° C. for 3 hours and at 250° C. for 5 hours to yield 326.8 g product.

This polyimide was soluble in N-methylpyrrolidone and dimethylacetamide as well as in dichloromethane and meta-cresol.

Differential Scanning Calorimetry (DSC) was performed on the above polymer using a Du Pont Thermal Analyzer Model 990-3 with cell model HC81-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 400° C. and a 40% weight loss was observed at 490° C.

A film of the above polyimide was prepared by pouring a 3% polymer solution in dichloromethane (based on weight) into a ring form 9.0 cm in diameter resting on a glass plate to a solution height of 0.16 cm at room temperature. The film was allowed to dry on the glass plate at room temperature and then removed from the plate by soaking in water. The film was further dried in a vacuum oven (20 inches mercury) at 70° C. for more than 6 hours.

The above films (film thickness=2.2 mils, $5.6 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 900 centiBarrer
$O_2/N_2$ Selectivity: 4.5

EXAMPLE 7

To a stirred solution of 4,4'-methylene-bis(2,6-diethylaniline) (31.0 g, 0.10 mol) in N-methylpyrrolidone (300 ml) was added 3,3',4,4'-benzophenonetetracarboxylic acid anhydride (32.55 g, 0.101 mol) under an inert atmosphere at room temperature. The slightly orange reaction solution was stirred at room temperature for 67 hours. A solution of triethylamine (55.75 ml, 0.4 mol) and acetic anhydride (37.74 ml, 0.4 mol) in N-methylpyrrolidone (150 ml) was added with rapid stirring at room temperature. After stirring for 4 hours at room temperature, the reaction solution was precipitated in water. The resulting solid was washed twice with water and methanol. The polymer was air dried overnight and then dried in a vacuum oven (20 inches mercury) at 120° C. for 3 hours and at 250° C. for 5 hours to yield 54.2 g product.

Films of the polyimide prepared above were cast from a 15% polymer solution (based on weight) in N-methylpyrrolidone onto a glass plate treated with TEFLON® dry lubricant at 102° C. with a 15-mil ($38.4 \times 10^{-5}$ m) knife gap. The films were dried on the plate at 102° C. for 30 minutes, cooled to room temperature and further dried in a vacuum oven (20 inches mercury) at room temperature overnight. The films were stripped off the plate and dried in a vacuum oven (20 inches mercury) at 120° C. for 4 hours.

The clear films were tough and flexible and could be creased without cracking.

The above films (film thickness=1.7 mils, $4.3 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 400 centiBarrer
$O_2/N_2$ Selectivity: 4.2

EXAMPLE 8

To a stirred solution of 4,4'-methylene-bis(2-ethyl-6-methyl aniline) (28.2 g, 0.10 mol) in N-methylpyrrolidone (300 ml) was added 3,3',4,4'-benzophenonetetracarboxylic acid anhydride (32.55 g, 0.101 mol) under an inert atmosphere at room temperature. The gold reaction solution was stirred at room temperature for 16 hours. A solution of triethylamine (55.75 ml, 0.4 mol), acetic anhydride (37.74 ml, 0.4 mol) and N-methylpyrrolidone (150 ml) was added with rapid stirring at room temperature. After stirring for 4 hours at room temperature, the reaction solution was precipitated in water. The resulting solid was washed twice with water and methanol. The polymer was air-dried overnight and then dried in a vacuum oven (20 inches mercury) at 120° C. for 3 hours and at 250° C. for 5 hours to yield 52.1 g product.

Differential Scanning Calorimetry (DSC) was performed on the above polymer using a Du Pont Thermal Analyzer Model 990-3 with cell model HC81-5/N00523, Baseline slope=5.0 in a nitrogen atmosphere at a 10° C./minute progress rate. No transitions correlatable to a Tg were observed up to 400° C by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 400° C. and a 40% weight loss was observed at 510° C.

A film of the above polyimide was prepared by pouring a 2% polymer solution in dichloromethane (based on weight) into a ring form 9.0 cm in diameter resting on a glass plate to a solution height of 0.16 cm at room temperature. The film was allowed to dry on the glass plate at room temperature and then removed from the plate by soaking in water. The film was further dried in a vacuum oven (20 inches mercury) at 70° C. for more than 6 hours.

The above films (film thickness=1.65 mils, $4.19 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 700 centiBarrer
$O_2/N_2$ Selectivity: 4.7

EXAMPLE 9

A stirred solution of 4,4'-methylene-bis(3-chloro-2,6-diethylaniline) (189.45 g, 0.5 mol), 3,3',4,4'-benzophenonetetracarboxylic acid anhydride (162.73 g, 0.505 mol), and N-methylpyrrolidone (1100 ml) was slowly heated to boiling with a slight nitrogen purge while allowing the distillates to collect. After 220 ml of distillates had been collected, the remaining distillates were allowed to flowback into the reaction solution. After heating at 204° C. for 6 hours, the viscous reaction solution was allowed to cool to room temperature. The solution was diluted with additional N-methylpyrrolidone and precipitated in water. The resulting solid was washed with water and methanol. The solid was air-dried overnight and dried in a vacuum oven (20 inches mercury) at 120° C. for 3 hours and at 250° C. for 5 hours to yield 332.6 g product.

Differential Scanning Calorimetry (DSC) was performed on the above polymer using a Du Pont Thermal Analyzer Model 990-3 with cell model HC81-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 425° C. and a 40% weight loss was observed at 530° C.

A film of the above polyimide was prepared by pouring a 2% polymer solution in dichloromethane (based on weight) into a ring form 9.0 cm in diameter resting on a glass plate to a solution height of 0.16 cm at room temperature. The film was allowed to dry on the glass plate at room temperature and then removed from the plate by soaking in water. The film was further dried in a vacuum oven (20 inches mercury) at 70° C. for more than 6 hours.

The above films (film thickness=1.6 mils, $4 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 500 centiBarrer
$O_2/N_2$ Selectivity: 4.7

EXAMPLE 10

A stirred solution of 4,4'-methylene-bis (2,6-diisopropyl aniline) (183.3 g, 0.50 mol), 3,3', 4,4'-benzophenonetetracarboxylic acid anhydride (162.73 g, 0.505 mol), and N-methylpyrrolidone (1100 ml) was slowly heated to boiling with a slight nitrogen purge while allowing the distillates to collect. After 200 ml of distillates had been collected, the remaining distillates were allowed to flow back into the reaction solution. After heating at 202° C. for 9 hours, the viscous reaction solution was allowed to cool to room temperature. The solution was diluted with additional N-methylpyrrolidone and precipitated in water. The resulting solid was washed with water and methanol. The solid was air-dried overnight and dried in a vacuum oven (20 inches mercury) at 120° C. for 3 hours and at 250° C. for 5 hours to yield 220.7 g product.

Differential Scanning Calorimetry (DSC) was performed on the above polymer using a Du Pont Thermal Analyzer Model 990-3 with cell model HC81-5/N00523, Baseline slope=5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 405° C. and a 40% weight loss was observed at 545° C.

A film of the above polyimide was prepared by pouring a 1% polymer solution in dichloromethane (based on weight) into a ring form 9.0 cm in diameter resting on a glass plate to a solution height of 0.16 cm at room temperature. The film was allowed to dry on the glass plate at room temperature and then removed from the plate by soaking in water. The film was further dried in a vacuum oven (20 inches mercury) at 70° C. for more than 6 hours.

The above films (film thickness=0.75 mils, $1.9 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 1500 centiBarrer
$O_2/N_2$ Selectivity: 4.6

EXAMPLE 11

A stirred solution of 4,4'-methylene-bis(2-methyl-6-isopropylaniline) (155.24 g, 0.5 mol) and 3,3',4,4'-benzophenonetetracarboxylic acid anhydride (162.73 g, 0.505 mol) in N-methylpyrrolidone (110 ml) was slowly heated to boiling with a slight nitrogen purge while allowing the distillates to collect. After 182 ml of distillates had been collected, the remaining distillates were allowed to flow back into the reaction solution. After heating at 203° C. for 6 hours, the viscous reaction solution was allowed to cool to room temperature. The solution was diluted with additional N-methylpyrrolidone and precipitated in water. The resulting solid was washed twice with water and twice with methanol. The solid was air-dried overnight and dried in a vacuum oven (20 inches mercury) at 120° C. for 3 hours and at 250° C. for 5 hours.

Films of the polyimide prepared above were cast from a 15% polymer solution (based on weight) in N,N'-dimethylacetamide onto a glass plate at 70° C. with a 10-mil knife gap. The films were dried on the plate at 70° C. for 2 hours and then stripped off the plate and further dried in a vacuum oven (20 inches mercury) at 150° C. overnight.

The above films (film thickness=0.7 mils, $1.8 \times 10^{-5}$ m) were tested for mixed gas $O_2/N_2$ (21/79 mole ratio) permeabilities at 500 psig ($34.5 \times 10^5$ Pa), 25° C. The results are reported below:
$O_2$ Productivity: 1000 centiBarrer
$O_2/N_2$ Selectivity: 5.1

I claim:
1. A process of separating two or more gases comprising the steps of bringing two or more gases into contact with one side of a permselective membrane which is formed of an aromatic polyimide of the formula:

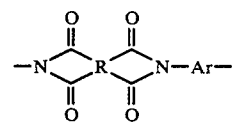

where —Ar— is

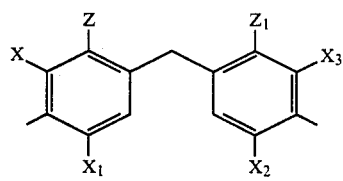

-continued

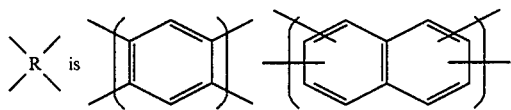

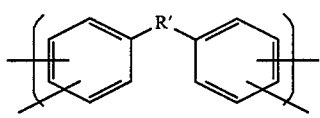

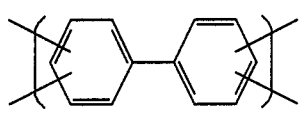

or mixtures thereof, —R'— is

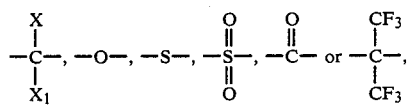

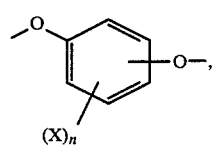

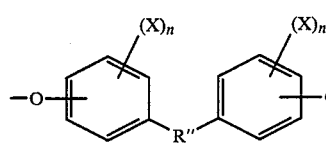

linear alkylene groups of the formula $(CH_2)_{1-3}$ or mixtures thereof, where —R"— is

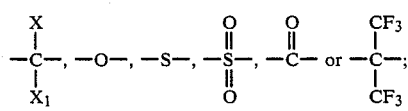

—X, —$X_1$, —$X_2$, and —$X_3$ are independently primary or secondary alkyl groups having 1 to 6 carbon atoms; —Z and —$Z_1$ are independently hydrogen or halogen, and where n=0-4.

2. The process of claim 1 where —Z and —$Z_1$ are hydrogen or chlorine.

3. The process of claim 1 where

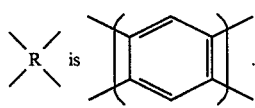

4. The process of claim 1 where

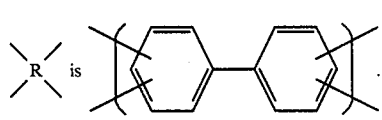

5. The process of claim 1 where

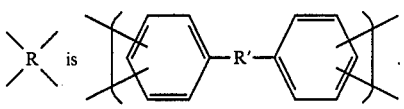

6. The process of claim 5 where

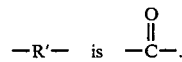

7. The process of claim 5 where

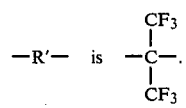

8. An aromatic polyimide gas separation membrane wherein the aromatic polyimide has the formula:

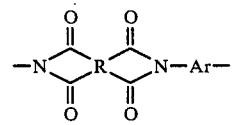

where —Ar— is

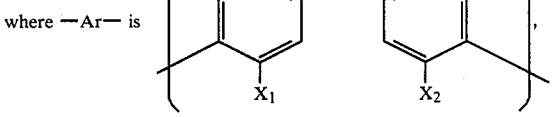

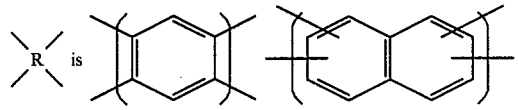

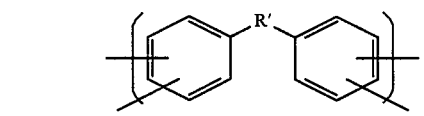

or mixtures thereof, —R'— is

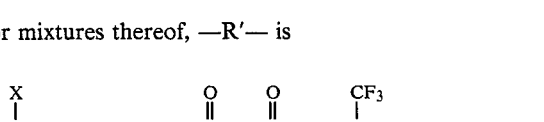

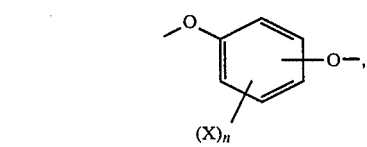

-continued

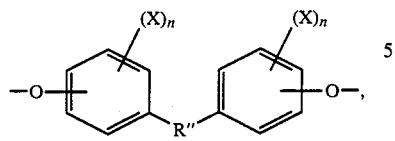

linear alkylene groups of the formula $(CH_2)_{1-3}$ or mixtures thereof, where —R″— is

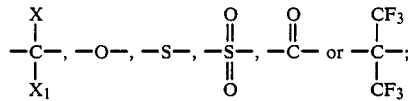

—X, —$X_1$, —$X_2$, and —$X_3$ are independently primary or secondary alkyl groups having 1 to 6 carbon atoms; —Z and —$Z_1$ are independently hydrogen or halogen, and where n=0-4.

9. The gas separation membrane of claim 8 where —Z and —$Z_1$ are hydrogen or chlorine.

10. The gas separation membrane of claim 8 where

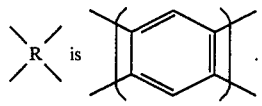

11. The gas separation membrane of claim 8 where

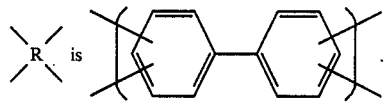

12. The gas separation membrane of claim 8 where

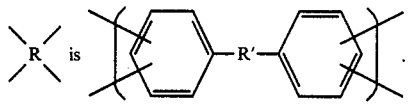

13. The gas separation membrane of claim 12 where

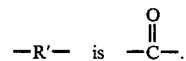

14. The gas separation membrane of claim 12 where

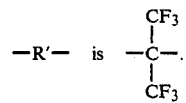

* * * * *